US006238797B1

(12) United States Patent
Nozawa et al.

(10) Patent No.: US 6,238,797 B1
(45) Date of Patent: May 29, 2001

(54) RECORDING SHEETS

(75) Inventors: Takashi Nozawa; Tetsuya Abe; Satoru Sugita, all of Kanuma (JP)

(73) Assignee: Sony Chemicals Corporation, Tokyo (JP)

( * ) Notice: Subject to any disclaimer, the term of this patent is extended or adjusted under 35 U.S.C. 154(b) by 0 days.

(21) Appl. No.: 09/108,427

(22) Filed: Jun. 30, 1998

(30) Foreign Application Priority Data

Jul. 8, 1997 (JP) ........................................ 9-182151

(51) Int. Cl.[7] ........................................ B32B 9/04

(52) U.S. Cl. .................... 428/411.1; 428/195; 428/500; 428/522

(58) Field of Search .................... 428/195, 411.1, 428/500, 522

(56) References Cited

FOREIGN PATENT DOCUMENTS 0 227 417 A2 * 1/1987 (EP) .
0 754 560 A1 1/1997 (EP) .
1-229685 * 1/1987 (JP) .
8-25776 * 1/1996 (JP) .
9-71040 3/1997 (JP) .
9-71041 3/1997 (JP) .
WO 96/18496 6/1996 (WO) .

* cited by examiner

*Primary Examiner*—Bruce H. Hess
(74) *Attorney, Agent, or Firm*—Oliff & Berridge, PLC

(57) ABSTRACT

It is an object of the present invention to provide a recording sheet which can produce colorful printed images of high quality without causing either problem of repelling of ink even in multicolor printing or blurring in the printed images with the lapse of time, and which can also confer high phototransmission on the printed images so that it is well suitable for a transparency for OHP.

A recording sheet having an ink-receiving layer formed on at least one surface of a substrate is disclosed, wherein said ink-receiving layer is formed by applying a resin solution comprising (a) a resin containing (1) a component presenting water-solubility in its molecules and (2) a component containing a functional group forming a crosslinking point in its molecules and presenting water-solubility before a crosslinking point is formed, and (b) a water-soluble resin on the substrate, and thereafter forming a crosslinking point.

13 Claims, No Drawings

RECORDING SHEETS

FIELD OF THE INVENTION

The present invention relates to recording sheets for use in recording with ink. More specifically, it relates to recording sheets which can provide high-quality printed images even in multicolor printing and which is also suitable for a transparency for OHP.

PRIOR ART

Ink-jet printers are widely used in the art because of their clear images and reasonable prices.

With such ink-jet printers, recording takes place by generating small droplets of ink by various operating mechanisms incorporated in the printers so that these small droplets are received on an ink-receiving layer of a recording sheet.

Ink-jet printers normally use water-based ink from the viewpoint of safety or avoidance of clogging. Thus, the ink-receiving layer of the recording sheet is made from a water-soluble resin or a water-absorbing resin which readily takes up water-based ink.

Recently, it has become common to convert an image datum captured by a digital camera into a printing signal with a data processing apparatus such as a personal computer to form a printed image on a recording sheet by an ink-jet printer.

Such a technique eliminates the necessity of developing a film and remarkably reduces costs, as compared with conventional so-called silver salt photography using an optical camera and a photosensitive film.

Since the resulting printed images are to be compared with photographic images, they are required to have high quality in terms of sharpness and colorfulness.

Conventional recording sheets however have not been thoroughly examined with respect to obtaining colorful printed images of high quality.

Generally, three inks with different colors, i.e. yellow, magenta, and cyan, or four inks including black in addition to said three colors are required for obtaining colorful printed images.

In order to obtain high quality printed images, the resolution must be increased and distances between inks with different colors as described above have been reduced.

Conventional recording sheets had the problem or so-called “repelling” which means that inks with different colors as described above printed in close proximity repel each other to leave unprinted portions. This problem of repelling was frequently observed in recording sheets based on water-soluble resins.

The above problem of repelling occurs less frequently in conventional recording sheets based on water-absorbing resins, but they had another problem of so-called “blurring” which means that inks of printed images diffuses into the receiving layer with the lapse of time to make the outlines of printed images unclear.

The recording sheets also had the problem that they are unsuitable for a transparency for OHP (overhead projector) because the ink-receiving layer itself is highly phototransmissive but printed images formed on the ink-receiving layer are not phototransmissive enough.

Accordingly, it is the first object of the present invention to provide a recording sheet which can produce colorful printed images of high quality without causing either problem of repelling of ink even in multicolor printing or blurring of printed images after a lapse of time.

In addition to said first object, it is the second object of the present invention to provide a recording sheet which can produce highly phototransmissive printed images on the ink-receiving layer so that it is suitable for a transparency for OHP.

SUMMARY OF THE INVENTION

In order to solve the problems mentioned above, the present invention provides a recording sheet having an ink-receiving layer formed on at least one surface of a substrate, characterized in that said ink-receiving layer is formed by applying a resin solution comprising a resin (a) containing a component (1) presenting water-solubility in its molecules and a component (2) containing a functional group forming a crosslinking point in its molecules and presenting water-solubility before a crosslinking point is formed, and a water-soluble resin (b) on the substrate, and thereafter forming a crosslinking point, as defined in claim 1.

The component (1) presenting water-solubility of the resin (a) here include polyalkylene oxides, as defined in claims 1 to 2.

The component (2) containing a functional group forming a crosslinking point of the resin (a) include a component containing an isocyanate group which is protected against reaction with water by a protecting group, as defined in claims 3 to 4.

The water-soluble resin (b) include polyvinyl alcohols, as defined in claims 5 to 8.

In a recording sheet, the ratio between the resin (a) and the water-soluble resin (b) in the ink-receiving layer in % by weight include in the range from 5:95 to 30:70, as defined in claims 9 to 16.

Furthermore, a recording sheet can also be mentioned wherein the ratio between the resin (a) and the water-soluble resin (b) in the ink-receiving layer in % by weight is in the range from 5:95 to 20:80, as defined in claims 17 to 24.

Careful investigations of conventional recording sheets led us to the following findings.

Water-soluble resins have a good affinity for water-based inks used in ink-jet printers. Namely, when a water-soluble resin is used for the ink-receiving layer, the in readily spreads over the surface of the receiving layer to facilitate mutual contact between adjacent ink portions before it is absorbed into the receiving layer.

If a multicolored printed image is to be formed, inks with different colors are required which normally vary in surface tension, drying characteristics and absorption characteristics for the receiving layer or other characteristics depend on the difference in the ingredients of their coloring materials (dyes and pigments) or dispersants for dispersing their coloring materials. When these inks with different properties come into contact with each other, repelling occurs due to low affinity for each other.

On the other hand, water-absorbing resins are highly absorptive and unsoluble in water.

Therefore, when a water-absorbing resin is used for the ink-receiving layer, the problem of repelling as described above is less likely to occur because ink is absorbed into the receiving layer without spreading over the surface of the receiving layer.

However, because of the high water absorbing property, water in the ink is to be taken up in the receiving layer without evaporating into the air. As a result, ink may readily diffuse into the receiving layer even after a printed image is produced, whereby blurring occurs to make the outline of the printed image unclear. In addition, water-absorbing resins are swollen with ink absorbed therein to lower the phototransmission of printed images.

In order to solve the problems as described above, a recording sheet having an ink-receiving layer comprising a water-soluble resin and a water-absorbing resin in an appropriate ratio to control the ability of absorbing ink or other properties is contemplated from the prior art.

However, it is difficult to prepare such a recording sheet. Namely, water-absorbing resins are not soluble in water and can not be homogeneously mixed with water-soluble resins if water is used as a solvent for dissolving both resins.

Even if an alcoholic solvent capable of dissolving both resins is selected, the ink-receiving layer prepared from such a mixed solution whitens to lower the phototransmission because the solubility of water-soluble reins become lower.

As a result of long-term study, we developed a recording sheet having an ink-receiving layer formed by applying a resin solution comprising a resin (a) containing a component presenting water-solubility and a component containing a functional group forming a crosslinking point in its molecules and presenting water-solubility before a crosslinking point is formed, and a water-soluble resin (b) on a substrate, and thereafter forming a crosslinking point. Namely, the resin (a) of the present invention can be homogeneously mixed with the water-soluble resin as desired because it shows water-solubility before a crosslinking point is formed. As a result, the contradictory problems of repelling and blurring associated with conventional recording sheets can be solved.

When the resin (a) and the water-soluble resin (b) are mixed in a specific ratio, the phototransmission of the entire ink-receiving layer and even the phototransmission of printed images on the receiving layer can be improved to provide a recording sheet well suitable for a transparency for OHP.

DETAILED DESCRIPTION OF THE INVENTION

Recording sheets according to the present invention have an ink-receiving layer formed on at least one surface of a substrate.

The substrate can be made from paper or a plastic film.

If a recording sheet of the present invention is desired to be used for a transparency for OHP, the substrate is also made from a highly phototransmissive plastic film.

Specifically, such a film may include polyester films, polyvinyl chloride films, polyethylene films and polypropylene films.

Among them, polyester films can preferably be used because of their high mechanical strength and low cost. The thickness of the substrate is not limited, but generally 50–200 $\mu$m.

The ink-receiving layer according to the present invention comprises a resin (a) containing a component (1) presenting water-solubility and a component (2) containing a functional group forming a crosslinking point in its molecules and presenting water-solubility before a crosslinking point is formed, and a water-soluble resin (b).

The component (1) presenting water-solubility of the resin (a) according to the present invention may include polyalkylene oxides containing repeated units of an alkylene oxide monomer such as ethylene oxide, propylene oxide, etc.; oligomers or polymers containing repeated units of a vinyl monomer having a hydrophilic group such as a carboxylate, carboxyl, —OH, —ONa or amino group on its side chain.

Polyalkylene oxides may preferably be used because of their good compatibility with a wide variety of water-soluble resins. The average molecular weight of these polyalkylene oxides is generally chosen to be 2000–10000 from the viewpoint of application.

The component (2) containing a functional group forming a crosslinking point in its molecules may be a component containing a functional group such as an isocyanate, carboxylate, carboxyl, OH, amino or epoxy group.

Especially, the component containing an isocyanate group capable of forming a crosslinking point by reacting with moisture in air or residual moisture in the formed ink-receiving layer or capable of forming a crosslinking point by self-polymerization are preferred.

Specific examples of the component containing an isocyanate group may include diisocyanates such as 1,3-propane diisocyanate, 1,4-butane diisocyanate, 1,6-hexamethylene diisocyanate, decane diisocyanate, trimethylhexamethylene diisocianate; triisocyanates such as 1-methyl-2,4,6-triisocyanate, maphthalene-1,3,7-triisocyanate, triphenylmethane-4,4',4"-triisocyanate; or trimer adducts of tolylene diisocyanates.

The component (1) presenting water-solubility and the component (2) containing a functional group forming a crosslinking point described above can be graft-copolymerized or block-copolymerized or denatured to obtain the resin (a) of the present invention.

If the component (2) containing a functional group contains a functional group which reacts with water such as an isocyanate group as described above, the functional group should be protected by a protecting group.

The protecting group as used herein means a material which reacts with a functional group to bind it and then which is readily cleaved from the functional group by heat or light to liberate the functional group.

When the functional group is an isocyanate group, suitable protecting groups may include phenols; alcohols; activated methylene compounds such as ethyl acetoacetate, acetylacetone, diethyl maloneate; lactams such as $\epsilon$-caprolactam; imidazoles such as 2-methylimidazole, benzimidazole.

The resin (a) may also be commercially available as, for example, WS series (Meisei Kagaku).

In this invention, the water-soluble resin (b) means a resin which can be used as an aqueous solution or dispersion other than the resin (a) described above.

Specific examples of the water-soluble resin (b) used herein may include one or more selected from polyvinyl alcohols, polyvinyl pyrrolidones, starches, caseins, gum arabic, poly sodium acrylates, poly acrylic amide, polyvinyl acetates, celluloses such as carboxymethylcellulose, carboxyethylcellulose, etc.

Among them, polyvinyl alcohols can preferably be used because of their compatibility when the component (1) presenting water-solubility of the resin (a) is a polyalkylene oxide. Especially, the polyvinyl alcohols preferably have a saponification degree of 70–80 mol % and a polymerization degree of 300–1000 from the viewpoint of their compatibility with the resin (a).

The resin (a) and the water-soluble resin (b) described above may be mixed in any ratio, but a ratio between the resins (a) and (b) in an ink-receiving layer in % by weight of 5:95 to 30:70 is sufficiently effective to attain the first object of the present invention of solving the contradictory problems of repelling and blurring.

Advantages of the present invention can be derived by adaptation of preparation conditions even outside the above range.

A weight ratio between the resin (a) and the water-soluble resin (b) in % by weight of 5:95 to 20:80 is sufficiently effective to attain the second object of the present invention of solving the problem of phototransmission in addition to the first object described above.

Extender such as silica, talc, zeolite and alumina may be conveniently added within a range which may not lower the phototransmission of the ink-receiving layer.

Then, a process for preparing a recording sheet according to the present invention will be described.

At first, the resin (a) and the water-soluble resin (b) are dissolved in water or an aqueous solvent such as water-alcohol to prepare a resin solution. Then, said resin solution is applied on one surface of a substrate using a coating device such as a knife coater, gravure coater or bar coater, then the substrate is dried by heating it in a drying oven to evaporate an excess of the solvent.

Here, the substrate is dried by heating it in a drying oven at a temperature of 80–150° C. for 2–10 minutes to evaporate an excess of the solvent, after which the protecting group of the resin (a) is cleaved from the functional group to liberate the functional group. If the functional group is an isocyanate group, a crosslinking point is formed in molecules by moisture in air or residual moisture in the receiving layer or self-polymerization of the isocyanate group to complete a recording sheet of the present invention.

A recording sheet of the present invention with good surface smoothness free from bubbles in the ink-receiving layer can be completed by adopting two steps of initially drying the ink-receiving layer at 60–80° C. and then evaporating an excess of the solvent at 100–150° C. while cleaving the protecting group to form a crosslinking point. The thickness of the ink-receiving layer here is 3–25 μm, but not limited thereto.

The following examples illustrate the present invention without, however, limiting the same thereto.

EXAMPLES

Example 1

Preparation of a resin solution

A resin solution of the following composition was prepared.

| | parts by weight |
|---|---|
| Aqueous solution of resin (a) at 30% (WS-105, Meisei Kagaku) | 66.7 |
| Water-soluble resin (b) (polyvinyl alcohol (PVA505, product of Kuraray Co., Ltd.)) | 80.0 |
| Water | 860.0 |

The ratio between the resin (a) and the water-soluble resin (b) in % by weight is 20:80.

The component (1) presenting water-solubility in molecules of the resin (a) is a polyalkylene oxide (Mw 2000), and the component forming a crosslinking point is an isocyanate group protected by a protecting group.

Said polyvinyl alcohol has a saponification degree of 73.5 mol % and a polymerization degree of 500.

Preparation of a recording sheet

Then, said resin solution was applied on one surface of a substrate made from a transparent polyester film (A4100, Toyobo Co., Ltd.) of 100 μm in thickness, after which an excess of the resin solution was scraped off by using a bar coater to form an ink-receiving layer.

Then, the substrate was dried initially at 70° C. for 3 minutes, subsequently at 120° C. for 3 minutes to evaporate water.

Thus, the protecting group of the resin (1) in the ink-receiving layer was cleaved so that the resin (a) formed a crosslinking point to complete a recording sheet of Example 1. The thickness of the ink-receiving layer after dried was 10 μm.

Evaluation method

The recording sheet obtained as described above was evaluated on an ink-jet printer (MJ800C, EPSON) in the following aspects.

Inks packaged with said printer were used.

1. Repelling of printed images

Solid pattern images of various colors (cyan, yellow, magenta and black) were formed at a distance of a few millimeters in a row on the recording sheet obtained as described above.

Visual observations were made to examine whether or not repelling occurred at the boundaries between the solid pattern images of said four colors.

If repelling occurs, unprinted portions or distorted outlines of solid pattern images are observed.

The case in which such repelling was not observed is represented by ○, and the case in which repelling was observed or distorted outlines due to repelling were observed is represented by X.

2. Change of printed images with time

Similar solid pattern images were formed on another piece of the recording sheet obtained as described above and interiorly left for 3 months, after which visual observations were made to examine whether or not blurring occurred in the outlines of the solid pattern images.

The case in which blurring could not be observed in the printed images is represented by ○, and the case in which blurring could be observed is represented by X.

3. Phototransmission of printed images

For a transparency for OHP, printed images are required to by phototransmissive. Here, the recording sheet evaluated for repelling as described above was used for a transparency for OHP and phototransmission of printed images of three colors was visually observed.

Phototransmissive printed images suitable for a transparency for OHP are represented by ○, printed images which appear somewhat dark but acceptable for a transparency for OHP practically with no problem are represented by Δ, and non-phototransmissive printed images which appear dark when used for a transparency for OHP are represented by X.

Materials of the ink-receiving layer of Example 1 and evaluation results are shown in Table 1.

Results

As apparent from Table 1, the recording sheet obtained in Example 1 is free from repelling and blurring so that it can provide colorful printed images of high quality.

Printed images were phototransmissive suitable for a transparency for OHP.

Examples 2–6 and Comparative examples 1–4

Recording sheets were prepared in the same manner as described in Example 1 except that materials of the ink-receiving layer were replaced by those described in Table 1, and evaluated in the same manner as described in Example 1. The results are also shown in Table 1.

Results

As apparent from Table 1, Examples 2–4 and 6 encountered neither repelling nor blurring so that they can provide colorful printed images of high quality.

Their printed images were phototransmissive suitable for a transparency for OHP.

Also as apparent from Table 1, Example 5 encountered neither repelling nor blurring so that it can provide colorful printed images of high quality.

However, printed images of Example 5 were observed to be somewhat dark compared with Examples 1–4 and 6.

In comparative example 1, a recording sheet having an ink-receiving layer made from a water-absorbing resin was used, and thus corresponds to a prior art of the present invention.

As apparent from Table 1, the results of this Comparative example 1 showed that blurring occurred in printed images and that the printed images were less phototransmissive so that they appeared dark when used for a transparency for OHP.

In comparative example 2, a recording sheet having an ink-receiving layer made from a water-absorbing resin and a water-soluble resin was used.

This water-absorbing resin contains a polyalkylene oxide component and an isocyanate component in its molecules similarly to the present invention, but differs from the resin (a) of the present invention in that a crosslinking point has been formed in resin molecules before it is mixed with the water-soluble resin (b), and thus corresponds to a prior art of the present invention.

As apparent from Table 1, the results of Comparative example 2 showed that repelling was observed in printed images. Namely, Comparative example 2 did not have synergistic effect described in the present invention.

Although in comparative example 2, a water-absorbing resin and a water-soluble resin in the same ratio in % by weight as that of Examples 4 and 6 were used, the printed images appeared somewhat dark when used for a transparency for OHP.

TABLE 1

| | Ratio of materials of receiving layers in % by weight | | Evaluation aspects | | |
|---|---|---|---|---|---|
| | Resin (a) | Water-soluble Resin (b) | Blurring of printed images | Repelling of printed images | Phototrans-mission of printed images |
| Example 1 | 20 | 80 | ○ | ○ | ○ |
| Example 2 | 13 | 17 | ○ | ○ | ○ |
| Example 3 | 5 | 95 | ○ | ○ | ○ |
| Example 4 | 15 | 85 | ○ | ○ | ○ |
| Example 5 | 30 | 70 | ○ | ○ | Δ |
| Example 6 | 15 | 85*[1] | ○ | ○ | ○ |
| Comparative example 1*[3] | 100*[2] | — | X | ○ | X |
| Comparative example 2*[3] | 15*[2] | 85 | ○ | X | Δ |
| Comparative example 3 | 100 | — | X | ○ | X |
| Comparative example 4 | — | 100 | ○ | X | Δ |

*[1]Polyvinyl alcohol (PVA403, Kuraray Co., Ltd.)
*[2]Water-absorbing resin (Aquaprene L-710 Meisei Kagaku)
*[3]Methanol was used as a solvent.

In comparative example 3, a recording sheet having an ink-receiving layer solely consisting of the resin (a) of the present invention in which a crosslinking point was formed after the ink-receiving layer had been formed was used.

Namely, it has almost the same structure as that of Comparative example 1 described above.

As apparent from Table 1, the results of the Comparative example 3 showed that blurring occurred in printed images and that the printed images were less phototransmissive so that they appeared dark when used for a transparency for OHP.

In comparative example 4, a recording sheet having an ink-receiving layer solely consisting of the water-soluble resin (b) of the present invention was used, and thus corresponds to a prior art of the present invention.

As apparent from Table 1, the results of Comparative example 4 showed that repelling was observed in printed images.

Advantages of the Invention

As described above, recording sheets of the present invention have the remarkable effect of providing colorful printed images of ;high quality compared with conventional recording sheets without causing either problem of repelling or blurring even in multicolor printing.

Recording sheets of the present invention also have the novel effect of attaining high phototransmission in not only the ink-receiving layer itself but also printed images on the receiving layer so that they are well suitable for a transparency for OHP.

What is claimed is:

1. A recording sheet for use in recording with ink comprising:

a flat substrate having a first side surface and a second side surface;

an ink-receiving layer formed on at least one surface of said substrate by crosslinking after applying an aqueous resin solution thereon, wherein said aqueous resin solution comprises:

water;

a resin (a) containing a component (1) presenting water-solubility and a component (2) containing a crosslinkable functional group which is protected against reaction with water by a protecting group and being water-soluble before forming a crosslinking structure wherein said crosslinkable functional group is an isocyanate group and said protecting group is selected from the group consisting of phenols, alcohols, activated methylene compounds, lactams, and imidazoles, and a water-soluble resin (b).

2. The recording sheet according to claim 1, wherein the component (1) presenting water-solubility of the resin (a) includes polyalkylene oxides.

3. The recording sheet according to claim 1, wherein the water-soluble resin (b) includes polyvinyl alcohol.

4. The recording sheet according to claim 2, wherein the water-soluble resin (b) includes polyvinyl alcohol.

5. The recording sheet according to claim 1, wherein the ratio between the resin (a) and the water-soluble resin (b) in the ink-receiving layer in % by weight is in the range from 5:95 to 30:70.

6. The recording sheet according to claim 2, wherein the ratio between the resin (a) and the water-soluble resin (b) in the ink-receiving layer in % by weight is in the range from 5:95 to 30:70.

7. The recording sheet according to claim 3, wherein the ratio between the resin (A) and the water-soluble resin (b) in the ink-receiving layer is % by weight is in the range from 5:95 to 30:70.

8. The recording sheet according to claim 4, wherein the ratio between the resin (A) and the water-soluble resin (b) in the ink-receiving layer in % by weight is in the range from 5:95 to 30:70.

9. The recording sheet according to claim 1, wherein the ratio between the resin (a) and the water-soluble resin (b) in the ink-receiving layer in % by weight is in the range from 5:95 to 20:80.

10. The recording sheet according to claim 2, wherein the ratio between the resin (a) and the water-soluble resin (b) in the ink-receiving layer in % by weight is in the range from 5:95 to 20:80.

11. The recording sheet according to claim 3, wherein the ratio between the resin (a) and the water-soluble resin (b) in the ink-receiving layer in % by weight is in the range from 5:95 to 20:80.

12. The recording sheet according to claim 4, wherein the ratio between the resin (A) and the water-soluble resin (b) in the ink-receiving layer is % by weight is in the range from 5:95 to 20:80.

13. The recording sheet according to claim 1, wherein said protecting group is selected from the group consisting of phenols, alcohols, acetylacetone, diethyl malonate, ε-caprolactam, 2-methylimidazole, and benzimidazole.

* * * * *